Sept. 10, 1929.  W. NAIDA  1,727,665
SPEED INDICATOR AND SIGNAL
Filed Nov. 11, 1924   2 Sheets-Sheet 1
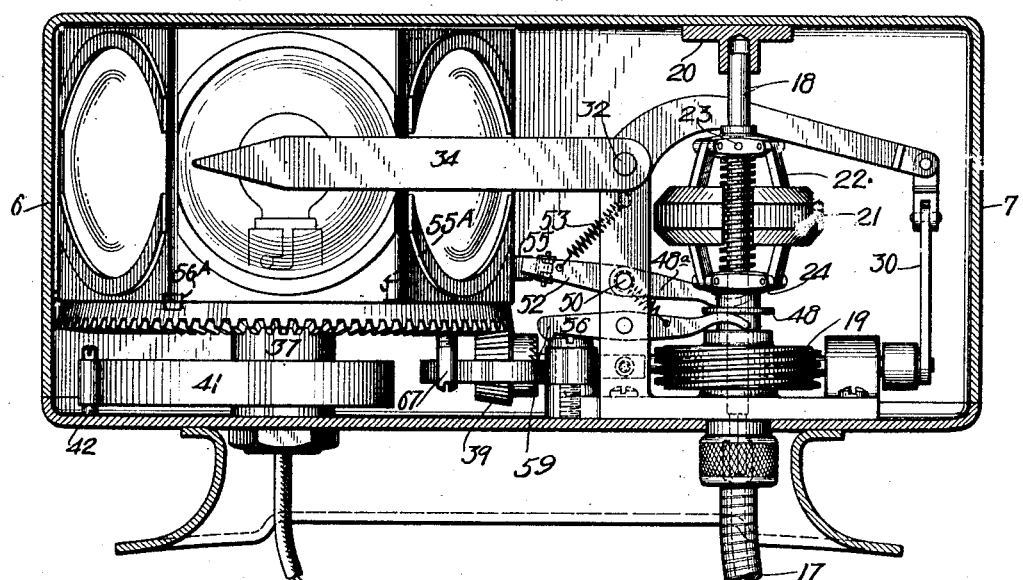
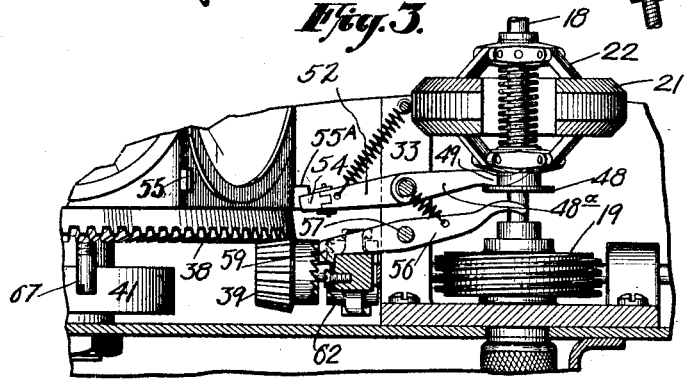
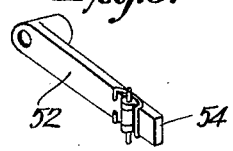
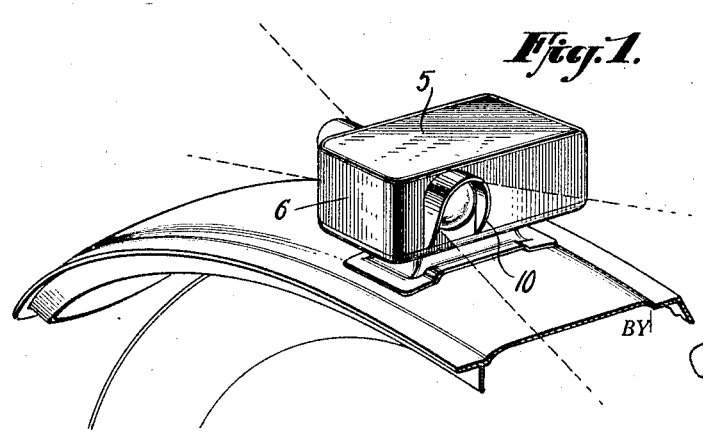
INVENTOR.
WILLIAM NAIDA.
BY Richard B. Owen
ATTORNEY.

Sept. 10, 1929.  W. NAIDA  1,727,665
SPEED INDICATOR AND SIGNAL
Filed Nov. 11, 1924  2 Sheets-Sheet 2

INVENTOR.
WILLIAM NAIDA.
BY
ATTORNEY.

Patented Sept. 10, 1929.

1,727,665

UNITED STATES PATENT OFFICE.

WILLIAM NAIDA, OF ASTORIA, NEW YORK.

SPEED INDICATOR AND SIGNAL.

Application filed November 11, 1924. Serial No. 749,270.

This invention relates to a speed indicator and signal device and more particularly to a novel and improved construction particularly adapted for use on vehicles, automobiles and the like to indicate different degrees of speed.

One of the objects of my invention is to provide an enclosed, visible, signal which is controlled and regulated by a novel and improved mechanism operable through the wheels of the said vehicle in such manner that the signal given will be in accordance with the speed attained.

Another object of my invention is to provide a visible signal, arranged for cooperative relation with the drive wheels of a motor vehicle, for instance, including a continuously operating arm, movable across the visible signal so as to show that the mechanism is in its operative condition.

A further object of my invention is to provide a movable, visible signal constructed and arranged to present different colors, indicative of normal or maximum speed, said signals being controlled by a governor operable from the driving wheel or the driven wheels of the vehicle.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a view showing the device mounted on the fender of an automobile, for instance.

Figure 2 is an interior view partly in section, showing the relative arrangement of the signal to the governor, operable from the drive wheels of a motor vehicle.

Figure 3 is an enlarged fragmentary view showing the relation of the governor to the escapement lever.

Figure 6 is a detail view of the escapement lever, shown by Figures 2, 3 and 4.

Figure 4:
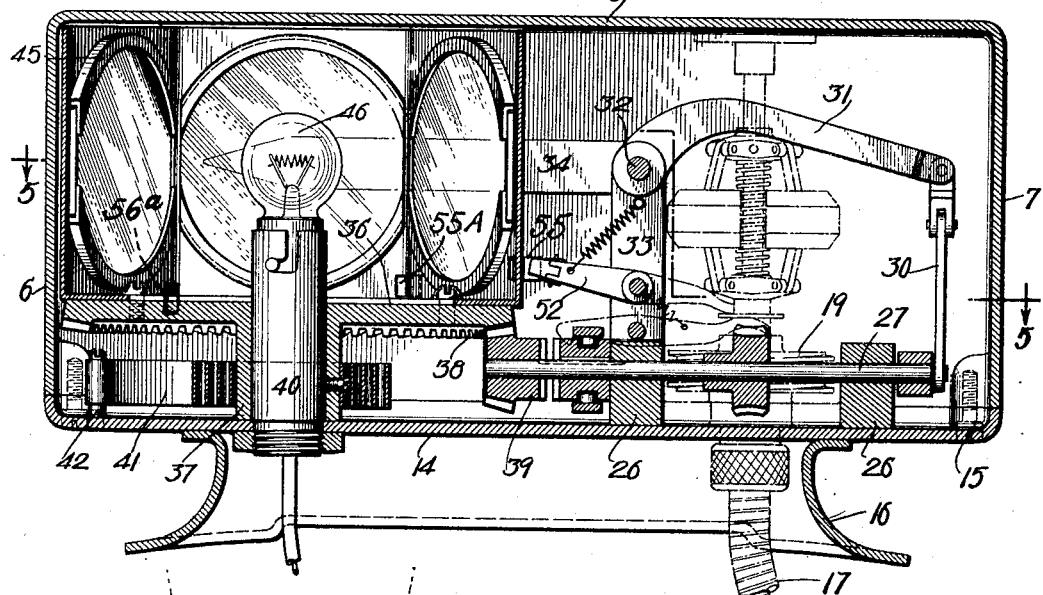
Figure 4 is a view similar to that shown by figure 2 taken from the opposite side of the mechanism.

Referring now to the drawings wherein like reference characters designate corresponding parts throughout the several views, 5 designates the top, 6, 7, the ends and 8, 9, the front and rear faces respectively of a substantially rectangular casing in which the mechanism is housed. The front and rear of the casing is provided with a hood 10, 11, for the observation openings 12, 13. A bottom closure plate 14 is secured in any well known manner such as by screws 15 to the bottom of the casing and any suitable type of flat support 16 on which the casing is mounted is provided so that the mechanism may be positioned on the fender for instance of the motor vehicle as shown by Figure 1 of the drawings.

A flexible lead 17 connected to the gearing, not shown, of the front wheel of the motor vehicle, for instance, is adapted to operate a vertical shaft 18 on which a worm 19 is mounted. The upper end of the shaft is journalled in bearings 20; said shaft supporting a spring controlled governor 21, the arms 22 of said governor being connected to suitable collars 23, 24.

The closure plate 14 supports a pair of bearings 26 in which a horizontal shaft 27 is mounted and driven by a gear 28 keyed to said shaft and meshing with the worm 19. On one end of the shaft 27, a crank shaft 30 is positioned, said shaft being connected to an operating arm 31 pivotally connected as at 32 to a support 33. A signal indicating arm 34, operable in a vertical plane is connected to one end of the arm 31 and movable therewith upon each operation of the crank shaft 30, it being of course understood that the said arm 34 extends across the observation openings 12 and 13 of the casing. The rocking motion transmitted to the shaft 32 through the operation of the shaft 27 will impart an upward and downward movement to each of the indicating arms 34 which will show that the device is in its operative condition for the reasons subsequently to be set forth.

At one side of the casing, I have provided a rotatable plate 36 having a sleeve 37, said plate being provided with teeth 38 on its periphery for engagement with a gear 39 mounted on the opposite end of the shaft 27. The said sleeve is loosely mounted for rotation about a lamp socket 40 and is held under tension by a clock spring 41, one end of the spring being connected to the sleeve and the opposite end to a pin 42. Mounted on the plate 36 are a plurality of lenses 44 held in the frames 45, it being of course understood that the lenses are of different colors such as blue, orange, and red, which indicate different degrees of speed. The socket 40 supports an incandescent globe 46, which shows the particular lens through the observation openings.

Connected to the governor 21 and at the bottom thereof, I have provided a flanged collar 48 which raises and lowers with the governor as the speed of rotation of the shaft 18 increases and diminishes. Mounted on the support 33 and below the shaft 32, an escapement lever 48ª is pivotally supported, the end 49 of said lever being in the path of movement of the collar 48. The lever 48ª is connected at its opposite end by means of a pin 50 to a trip lever 52 held in its normal position by a spring 53. A spring held extension 54 at the end of the trip lever 52 is adapted to engage a plurality of stops or lugs 55, 56ª, said lugs or stops being spaced from the bottom of the casing in which the lenses are mounted so that they will be engaged by the trip lever at different positions depending upon the operation of the governor. In other words, when the governor raises, the trip lever will be lowered so as to clear the first stop, permitting the casing and the lenses carried thereby to rotate until the next stop is engaged by the lever. If the speed still increases, the trip lever will be disengaged from the second stop and as the casing revolves, the third stop will engage the said lever, above referred to.

The collar 48 also controls the movement of a clutch locking lever 56, pivoted at 57 on the support 33, one end of said lever being in the path of movement of the collar 48. The opposite hooked end 59 of said clutch locking lever is adapted to engage a clutch lever 60, pivoted as at 61. One face of the clutch 62 is keyed to the shaft 27 and the clutch face 63 of the gear 39 is loose on the end of the shaft 27. A spring 64 is adapted to throw the clutch lever and the clutch 62 in engagement with the clutch face 63 so as to permit of the rotation of the casing and the lenses counter clockwise in resetting the signal, it being observed that a second spring 65 is also connected to the clutch lever and on the opposite side thereof, the spring 65 being adapted for engagement with a pin 67 on the bottom of the plate 36, which pin tends to cause the spring 65 to throw the clutch lever and the clutch 62 out of engagement with the clutch face 63 as the lens casing is returned to the normal position.

In the operation of the device and the mechanism, when the machine is operating at the normal rate of speed, the front and rear ends will indicate the legal rate of travel and since the shaft 18 is operating, the worm 19 and mesh gear 28, will in turn operate the shaft 27, thus imparting a reciprocating motion to the lever 31 and 34 through the member 30, so that the operator of the machine as well as the traffic officer, for instance, will observe that the device is in working order.

Now, as the speed increases, and the governor 21 rises, the collar 48 will engage the lever 48ª and the connected trip lever 52, whereupon the last mentioned lever will be disengaged from the lug or stop 55, permitting the rotation of the lens casing to the next stop 55ᴬ and the corresponding lens will show that the speed has been increased. As the speed of the machine further increases, the same operation occurs until the trip lever engages the third stop 56ᴬ which will be the red or danger signal showing that the operator is exceeding the speed limit. Now, when the operator slows down to lawful speed, and the governor descends, the collar 48 will engage the end of the lever 56, tripping the same whereupon the clutch lever 60 moves to the left by means of the spring 64 and the plate 36 will rotate the lenses in the opposite direction to set the device to the normal position until the pin 67 comes around and engages the spring 65 thus shifting the clutch lever 60 to the right, disengaging the clutch face 62 from the clutch face 63.

Figure 5:
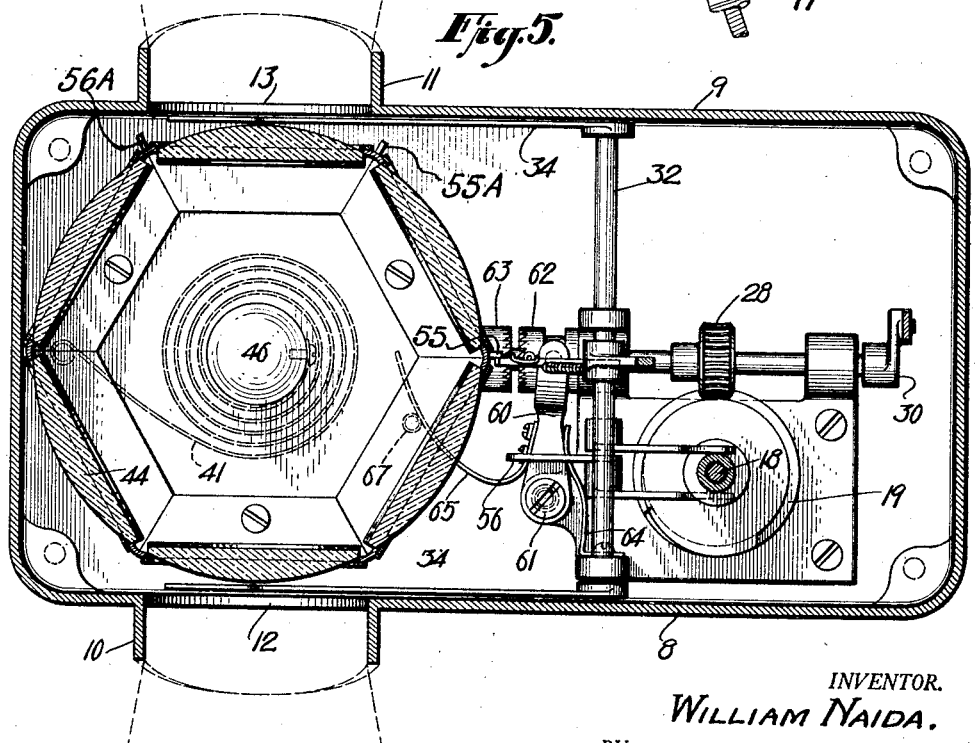
Figure 5 is a view taken on the line 5—5 of Figure 4.

It will thus be seen that the device is automatic and is controlled by the governor which of course is continuously rotating and at a speed depending upon the speed of travel of the machine, it being also evident that once an unlawful speed is attained, the vehicle will have to be brought down to lawful speed before the signal will be revolved to indicate the lawful speed. For instance, when the vehicle is slowed to lawful speed, the clutch will be operated to return the drum to its lawful speed position at which time the arm 65 throws the clutch to its non-operating position. I have made use of three stops, and consequently, three different sets of lenses, and at normal setting as indicated in Figure 5, a lawful speed or green light would show, while an unlawful city speed, or a speed that might be lawful outside of the city limits would be indicated by the next set of lenses showing perhaps a yellow light, while dangerous and unlawful speed would be indicated by a red light. It would be necessary for the driver to immediately cut down his speed to within the lawful limit if the lights were to be changed because the drum returning mechanism would not operate until lawful speed was travelled.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. A speed indicator comprising a casing having openings therein, a continuously rotatable shaft operable from the wheels of a vehicle, a governor keyed on said shaft, a rotatable signal box having a plurality of signal faces mounted within the casing, projections at spaced points on the periphery of the box, a pivoted lever having one end in the path of movement of the governor so that its movement depends on the speed of the governor, the opposite end of said lever being in the path of movement of said projections whereby the relative positions of said faces are controlled during the predetermined speed of the shaft and governor, a lever operable by the governor, a clutch, and a clutch arm engaged by the lever for controlling the clutch for causing return of the signal box to normal position.

2. A traffic meter and signal comprising a casing having sight openings therein, a continuously rotatable shaft operable from the wheels of a vehicle, a governor on said shaft, a revolvable signal box having a plurality of faces for register with the sight openings of the casing, a pivoted lever having one end in the path of movement of the governor, lugs secured to the signal box adapted to engage the opposite end of the lever when said lever is moved to different positions by the governor during predetermined speeds of the shaft, a spring for rotating the signal box in one direction to position the lugs for engagement with said lever, a clutch for reversing the movement of the signal box, a clutch operating arm, and a governor controlled lever for engagement with said arm.

3. A traffic meter and signal comprising a casing having sight openings therein, a continuously rotatable shaft operable from the wheels of a vehicle, a governor keyed on said shaft, a signal box having a plurality of faces rotatably mounted in one end of the casing, some of the faces being arranged to register with said sight openings, a driven shaft, gearing between the rotatable shaft and the driven shaft, an oscillating arm operable from the driven shaft across the front of the signal box, and an escapement lever having one end in the path of movement of the governor, lugs on the respective faces of the box to engage the opposite end of said lever when the lever is moved to different positions by said governor, a spring for rotating the signal box in one direction to bring the lugs into engagement with said lever, a clutch for reversing the movement of the signal box, a clutch operating arm, and a governor controlled lever for engagement with said arm.

4. A traffic meter and signal comprising a casing, a rotatable shaft operable from the wheels of a vehicle, a governor on said shaft, a rotatable signal box having a plurality of spaced projections on the signal box, a lever operable by the governor and arranged to contact with the projections for controlling the relative positions of said faces during predetermined speeds of said shaft, a driven shaft, a spring for rotating the signal box in one direction to bring the projections into engagement with said lever, a gear and clutch connection between the shaft and the signal box for reversing the rotation of said signal box when the speed of the governor decreases and a declutching member on the signal box.

5. A traffic meter and signal comprising a casing, a rotatable shaft operable from the wheels of a vehicle, a governor on said shaft, a signal box having a plurality of signal faces within said casing, a spring for moving the signal box in one direction, spaced projections on said signal box, a geared plate forming a bottom for the signal box, a driven shaft, gearing between the first mentioned shaft and the driven shaft, a lever operable by the governor and arranged to successively engage said projection for controlling the relative positions of said faces during increasing speeds of said rotatable shaft, a pinion loosely mounted on the driven shaft in engagement with said plate gear, a clutch keyed on the driven shaft for transmitting the movement of the shaft to the pinion to cause reset movement of the signal box, a control arm for holding the clutch out of engagement with the pinion and a latch arm operated by a movement of the governor to permit engagement of the clutch.

In testimony whereof I affix my signature.

WILLIAM NAIDA. [L. S.]